US005176326A

United States Patent [19]

Blackmon et al.

[11] Patent Number: 5,176,326
[45] Date of Patent: Jan. 5, 1993

[54] TURBULENT DROPLET GENERATOR WITH BOOM MOUNTED PITOT PUMP COLLECTOR

[75] Inventors: James B. Blackmon, Irvine; Robert E. Drubka, Huntington Beach, both of Calif.

[73] Assignee: McDonnell Douglas Corporation, Long Beach, Calif.

[21] Appl. No.: 627,334

[22] Filed: Dec. 14, 1990

Related U.S. Application Data

[62] Division of Ser. No. 356,055, May 23, 1989, Pat. No. 5,062,472.

[51] Int. Cl.[5] .......... B05B 1/32

[52] U.S. Cl. .......... 239/459; 239/456; 239/583

[58] Field of Search .......... 239/456-460, 239/581.2, 582.1, 583

[56] References Cited

U.S. PATENT DOCUMENTS

| | | | |
|---|---|---|---|
| 2,156,800 | 5/1939 | Bucknell et al. | 239/457 |
| 2,899,169 | 8/1959 | Klingler | 239/583 |
| 2,991,016 | 7/1961 | Allenbaugh, Jr. | 239/459 |
| 3,494,561 | 2/1970 | Buehler | 239/460 |
| 3,547,353 | 12/1970 | Pecka | 239/460 |

*Primary Examiner*—Andres Kashnikow
*Assistant Examiner*—Karen B. Merritt
*Attorney, Agent, or Firm*—Donald E. Stout; Gregory A. Cone; John P. Scholl

[57] ABSTRACT

A fluid ejection nozzle is disclosed which facilitates a wide distribution of fluid therefrom and which permits the fluid flow rate to be easily adjustable. The nozzle is particularly adapted to a heat rejection system useful in a space environment. The nozzle includes a flow distributor positioned within an orifice of the nozzle housing which is comprised of a tongue member and an attached flow control block. Adjustment screws mounted through the nozzle housing permit axial movement of the flow distributor within the housing, thus controlling the flow rate of the fluid even to the extent of total shut-off. The tongue member is shaped to widely disperse the fluid, and includes turbulence generators such as roughening or ridges for facilitating its dispersion.

10 Claims, 4 Drawing Sheets

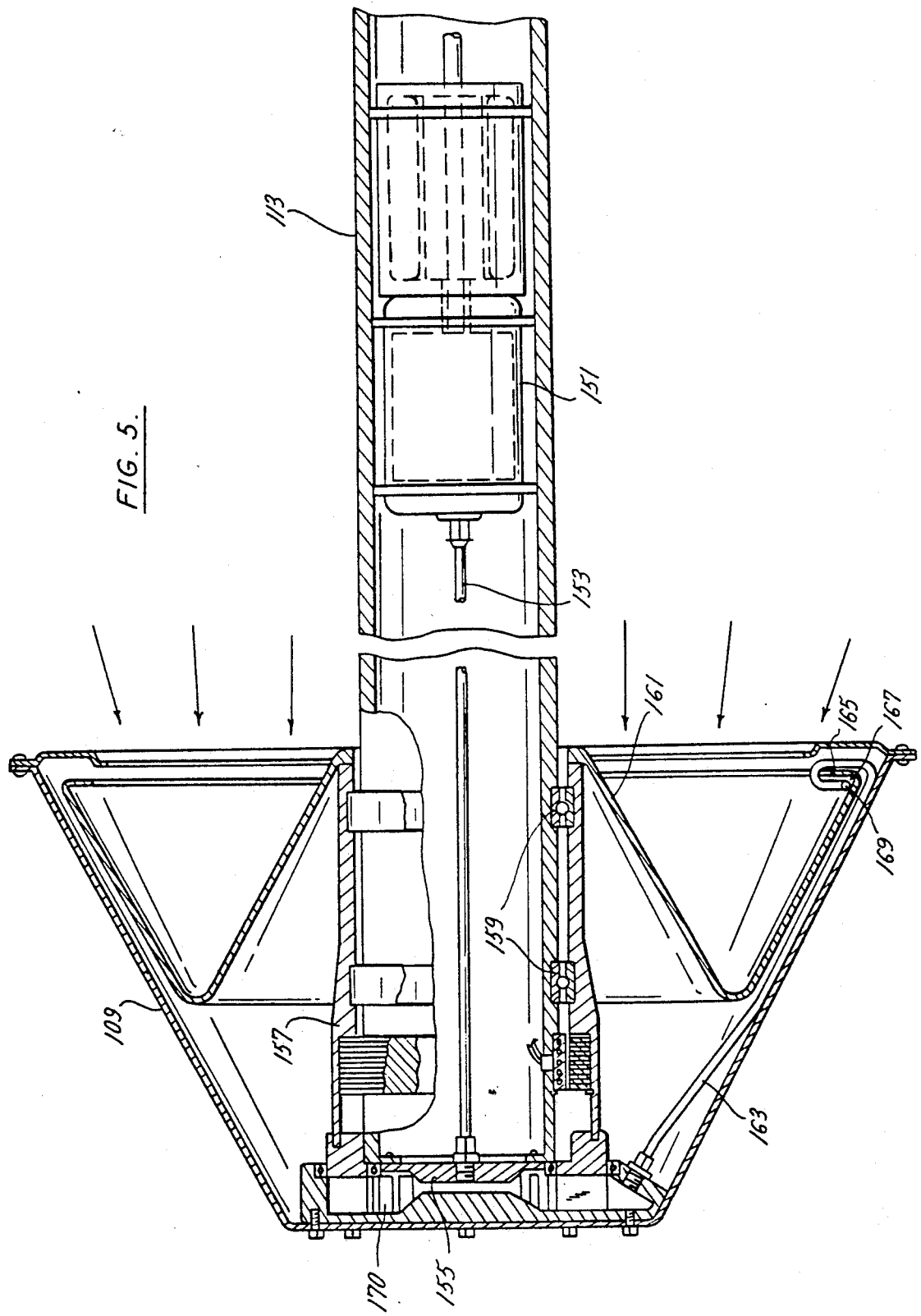

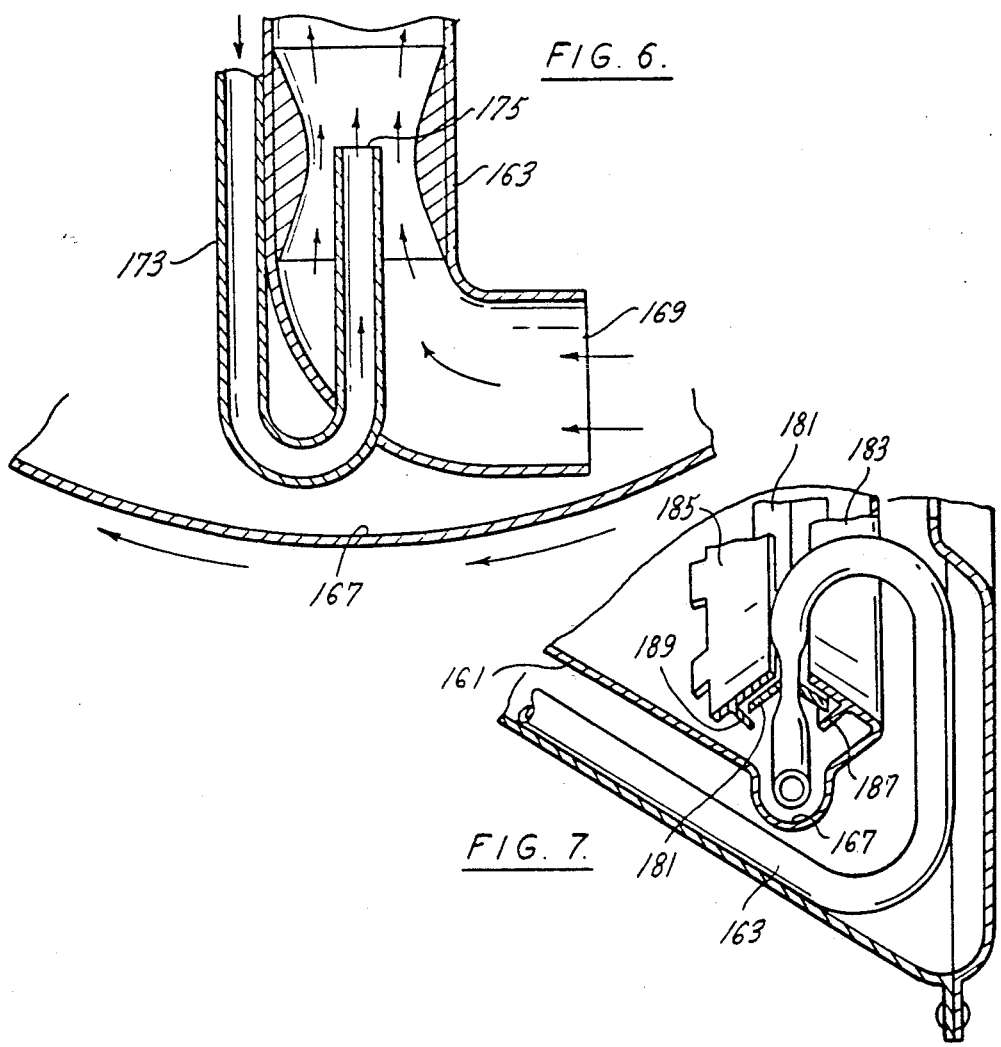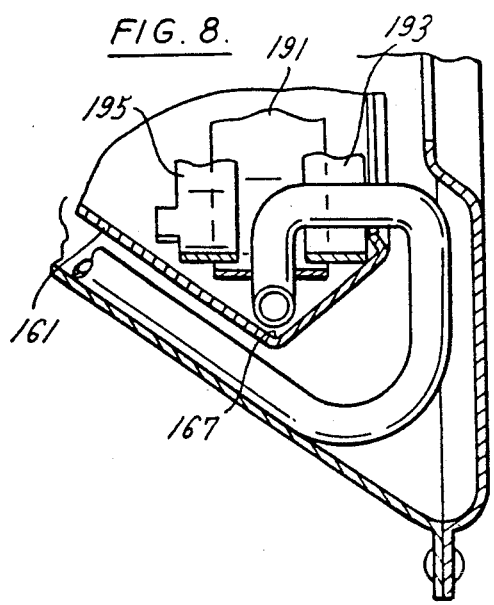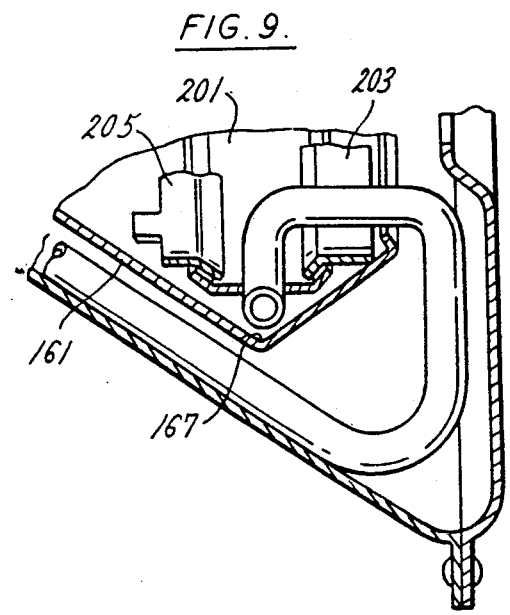

TURBULENT DROPLET GENERATOR WITH BOOM MOUNTED PITOT PUMP COLLECTOR

This is a division, of application Ser. No. 356,055, filed May 23, 1990 now U.S. Pat. No. 5,062,472.

BACKGROUND OF THE INVENTION

In systems producing large amounts of waste heat as a by-product of a necessary process, a method for efficiently removing such waste heat is highly desirable. This need is particularly acute for space systems wherein large amounts of heat are generated as a by product of space system operation. The weight limitation accompanying space designs dictates an efficient device for eliminating waste heat.

Numerous advanced heat radiation concepts have been proposed as potential improvements for heat rejection. U.S. Pat. No. 4,603,732, entitled "Heat Management System for Spacecraft" to Niggemann, et al, discloses a two phase heat management system which dissipates heat by evaporating a liquid and rejects heat by condensing the vapors. U.S. Pat. No. 4,572,285, entitled "Magnetically Focused Liquid Drop Radiator", to Botts, et al, discloses a magnetically focused liquid drop radiator for application in rejecting energy from a spacecraft, using magnetizable droplets.

U.S. Pat. No. 3,161,593, entitled "Method and Apparatus for Utilizing the Formation of Energy of Petroleum Deposits", U.S. Pat. No. 3,856,483, entitled "Method and Device for Degassing Liquids", U.S. Pat. No. 3,996,027, entitled "Swirling Flow Bubble Trap", U.S. Pat. No. 3,151,961, entitled "Vortex-Type De-Aerator and Strainer", U.S. Pat. No. 2,634,907, entitled "Process and Apparatus for Centrifugial Deaeration", U.S. Pat. No. 2,592,680, entitled "Apparatus for Removal of Gasses from Liquids", U.S. Pat. No. 2,216,939, entitled "Rotary Gas and Oil Separator", U.S. Pat. No. 3,271,929, entitled "Vortex Type Reconditioner and Reconditioning Method for Used Drilling Mud", U.S. Pat. No. 3,290,864, entitled "Gas Separation Pump for Liquid Circulating Systems", U.S. Pat. No. 3,771,290, entitled "Vortex De-Aerator", and U.S. Pat. No. 3,797,661, entitled "Method and Apparatus for Separating Granules from a Liquid" all disclose various forms of liquid separation from another medium. U.S. Pat. No. 3,405,454, entitled "Waste Management System" discloses a human waste treatment system. In the present application, however, liquid collection is performed in the vacuum of space, and the liquid is collected rather than separated from another medium.

Even under the most extreme of circumstances, the above disclosures have a low utility as applied to the space environment. In addition to satisfying the generalized requirements of space power systems, the radiator must avoid single-point failure modes; interface with the relatively high temperatures of the power conversion system; have compact stow capability; and offer a significant decrease in total system mass, while operating in a hostile environment.

Current systems for heat rejection in space rely primarily on the proven heat pipe radiator. Evolutionary improvements in heat pipe radiators should increase survivability and provide compact stow capability. Design improvements to enhance heat transfer and condensate flow should decrease radiator specific weight and extend the operating regime to higher heat fluxes. However, these potential improvements are limited when both survivability and decreased system weight goals are prescribed. In addition, heat pipe concerns include (1) susceptibility to directed energy, including effects of heat transfer fluid loss, (2) noncondensible gas formation over the 10-year life, and (3) total system mass of large-scale systems, especially when provided with protection barriers; as are required for hostile threats.

Another heat transfer scheme involves the transmission of heat to a fluid medium, the exposure of the fluid to the vacuum of space, and the subsequent collection of the heat depleted fluid for recycling back through the system. Typically, droplets of a heat-transfer fluid (e.g., silicone oils, liquid metals) would be ejected from barely visible holes approximately 25 to 100 microns in diameter at velocities of 5 to 20 meters/second. These small holes provide the thin streams which then break up into small droplets approximately twice the diameter of the orifices. For large space systems requiring the rejection of from 5 to 20 megawats thermal, hundreds of thousands to millions of orifices would be required. This poses an especially difficult cost challenge, and the orifices must all be accurately formed and maintained to avoid misdirected droplet streams. The radiating area for this amount of heat would be approximately half the size of a football field. Droplets would be ejected towards the collector over distances of 10-50 meters. During their several seconds of flight, they would radiate energy to space.

At the end of their path, they would strike a centrifugal collector, spin to the outer rim of the collector, and form a thick annular film which would be pumped through a pitot tube into a higher pressure pump. The higher pressure pump would then send the liquid back into the power-conversion system. The reheated liquid would then be ejected through the orifices again to cool and recirculate. In order to place such a droplet forming and collection system in the harsh environs of space an immediately recognizable series of problems must be solved.

The collection and pumping of liquids in a microgravity environment presents major problems. An ordinary centrifugal collector can provide moderately high collecting and pumping forces, but those which use rotary seals with flow introduced through an axial pipe, may cause the rotary seals to leak, and the additional flow introduced decreases the net outlet flow. These devices, which were developed by the University of Washington and Spectra Technology, Inc., nevertheless demonstrated successful operation. Other types of centrifugal collectors, using an auxiliary air flow to collect urine, have also been developed and flown on Skylab. A similar device has been flown on the Space Shuttle.

In addition, such a system for heating the fluid, transmitting the fluid through space to allow radiation and capturing the fluid for recycling, must capture high temperature liquid metals and lose less than one part per one hundred million of the fluid medium in order to meet the long term requirements of that system.

A typical centrifugal collector/pump design having a rotating collector, pitot tubes for low pressure of outflow of collected liquid, and separate, higher pressure pumps for reaching the pressures required at the droplet generators will not solve the following problems:

(a) The collector has a very low velocity on the inner surface near the rotational axis (and zero velocity on the rotational axis). Therefore, droplets striking this region may not acquire sufficient velocity to be forced to the outer rim. Droplet loss could occur in this region.

(b) The motor, gearbox, collector, pump, and pitot tubes are all separate entities "bolted" together. Multiple interfaces, housings, flanges, etc., increase weight and volume. An integrated system will reduce weight and volume.

(c) The motor, collector, and pump must be mounted by a less efficient structure that attaches to the rear of the collector, and then the return line must be run along with the structure.

SUMMARY OF THE INVENTION

Although a fluid droplet generation, transmission and collection system will provide the necessary heat radiation, the details of construction which will overcome the challenges of the space environment are of great interest. This invention relates to improvements in the mounting of the collector, the design of the collector pump, and the design of the droplet generator.

The turbulent droplet generator of the present invention offers the following advantages:

(a) Piezoelectric devices or other mechanical means of inducing pressure fluctuations so as to induce stream breakup into droplets are eliminated. Instead, the droplet generator of the heat elimination system of the present invention employs a combination of turbulence—generating vanes, rakes, wedges, teeth, and roughened surfaces—so as to produce sufficient vortex formation to induce stream breakup into droplets of small size.

The turbulent method is a fundamental advantage since it not only eliminates the electro-mechanical devices required on present generators, but efficiently transforms the kinetic energy of turbulence into the surface free energy for the droplets. Use of multiple small orifices, as in prior art, eliminates the turbulent kinetic energy by viscous dissipation, and thus decreases the efficiency of droplet formation. The small orifices were prone to clogging, especially when using liquid metals as the working fluid. Further, high pressure flow was required. The device used in the system of the present invention decreases the pressure required and thus reduces overall system mass and pump power requirements.

(b) Rather than use multiples of small holes which are subject to erosion, the droplet generator of the system of the present invention uses two-dimensional "slots" which cause one or more thin sheets to flow out in a given direction (normally parallel flow). This larger outflow area minimizes the potential for clogging, erosion, or stream misdirection and reduces pressure drop.

(c) The design of the generator is such that the flow rate can be controlled by the movement of the "wedge" to induce changes in such flow characteristics as sheet thickness, velocity, and direction. The generator design can be cylindrical, as well as slotted, and the "wedge" shape would then be conical.

(d) The generator of the system of the present invention has a built-in shut-off valve that eliminates fluid loss as occurs downstream of the valve for a standard droplet generator with its plenum.

(e) The stream sheet or sheets exiting the slots of the generator used in the present system are initially continuous and therefore provide a relatively high optical depth.

The liquid collection and pumping subsystem of the present invention offers the following advantages:

The boom mounting of the liquid collection subsystem of the present invention offers the following advantages:

(a) For liquid (streams, droplets) entering the collector opening, there is no region not having the necessary rotational velocity to impart outward movement of the liquid to the collector outer rim. This assures efficient collection.

(b) The gear-motor, collector, pump, and pitot tubes are completely integrated into a low mass, compact volume.

(c) The motor that drives the pump is integrated into the boom with a hollow shaft to efficiently allow liquid to be pumped to the generators.

(d) A hollow shaft ring motor is used to drive the collector.

(e) The ring motor and collector are configured with an integral impeller and inlet accumulator to efficiently pressurize the low pressure liquid forced out of the collector through the pitot tubes.

(f) The outer configuration of the collector and pitot tubes allows use of anti-splash baffles and jet pump designs.

(g) The interior of the boom can be configured as an accumulator; thus, the structural wall serves to support the collector and retain liquid for continuous flow in the event of momentary flow disruption.

(h) A non-rotating shroud encloses, protects, insulates and provides structural support for the rotating collector. Heating and cooling elements can be added to this shroud if required for thermal control.

BRIEF DESCRIPTION OF THE DRAWINGS

The structure and method of operation of the invention, together with additional advantages thereof, will be best understood from the following description of specific embodiments when read in connection with the accompanying drawings, in which:

FIG. 5. is a sectional view of the boom mounted liquid collection portion if the liquid droplet radiator system module of FIG. 2. illustrating the drive motor and coolant liquid return system.;

FIG. 6. is a detail of the flow injected pitot tube collection arrangement used in the liquid collection portion of the liquid droplet radiator system module of previously shown in FIGS. 1, 2, and 5;

FIG. 7. illustrates the mechanical detail of a first anti-splash design utilizable in the liquid collection portion if the liquid droplet radiator system module of FIGS. 1 and 2;

FIG. 8. illustrates the mechanical detail of a second anti-splash design utilizable in the liquid collection portion if the liquid droplet radiator system module of FIGS. 1 and 2; and FIG. 9. illustrates the mechanical detail of a third anti-splash design utilizable in the liquid collection portion if the liquid droplet radiator system module of FIGS. 1 and 2.

DETAILED DESCRIPTION OF THE PREFERRED EMBODIMENT

Figure 1:
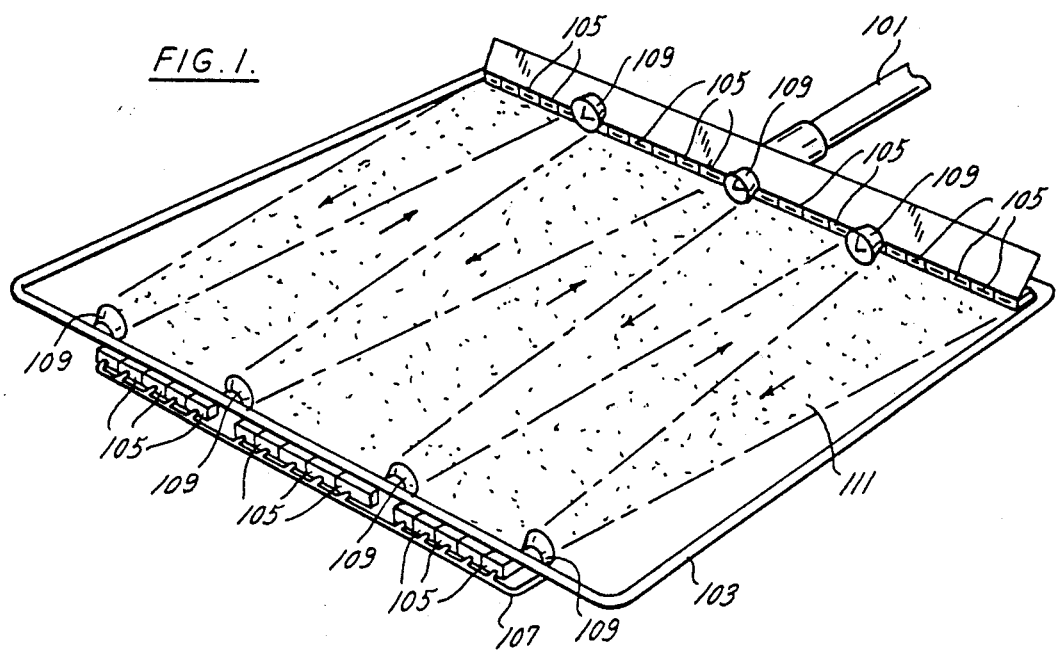
FIG. 1. is a general illustration of a rectangular support structure with several oppositely oriented liquid droplet radiator system modules of the present invention structurally mounted and operationally in place.

Referring to FIG. 1, there is shown an isometric view of the liquid droplet radiator system in a multiple module orientation as it might appear operationally in a space environment. A main support 101 is shown extending to the upper right portion of the FIG. in broken line form. Support 101 may connect to any structure. In the environment of space this may be a space station, space shuttle, or satellite.

Attached to support 101 is a generally rectangular support structure 103. Support 101 and support structure 103 support the liquid droplet radiation and collection structures. A series of liquid ejectors 105 are located about two sides of support structure 103. Each section of liquid ejectors 105 is in fluid connection with a supply pipe 107 which provides a pressurized supply of hot fluid. Each section of liquid ejectors 105 is oriented opposite a circularly shaped collector 109. Between each section of liquid ejectors 105 and their associated collector 109 is an array of fluid in transit from the ejectors 105 to their associated collector 109.

Figure 2:
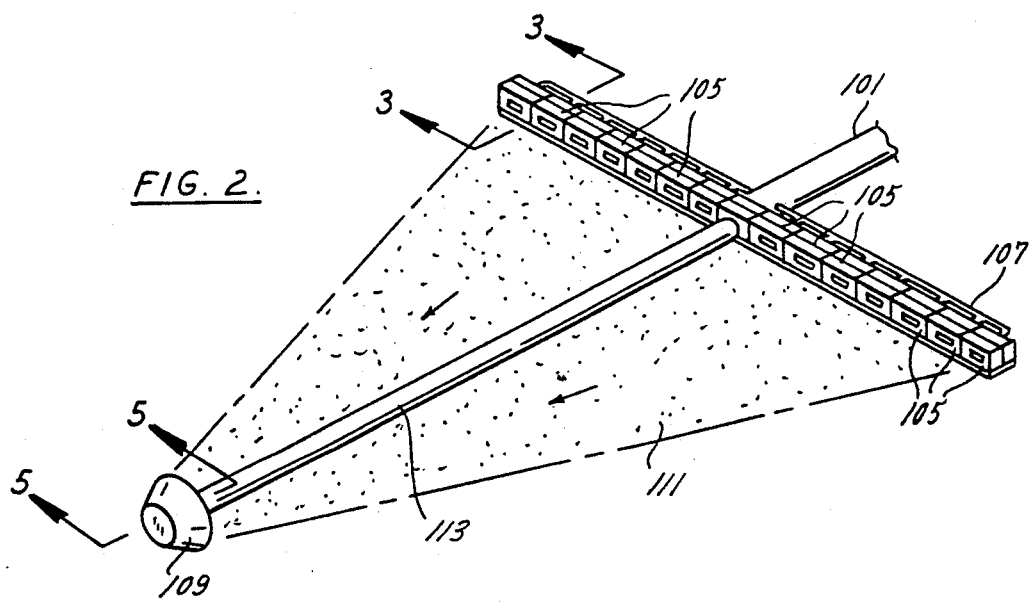
FIG. 2. is an illustration of a single liquid droplet radiator system module, as was multiply illustrated in FIG. 1, illustrated with boom mounting and revealing greater detail of the multiplicity of cooling fluid ejectors.

Referring to FIG. 2, a single liquid droplet radiator system module is shown. FIG. 2 is different from FIG. 1 in the method of supporting the circularly shaped collector 109. A boom 113 extending from support 101 supports the circularly shaped collector 109. The operation afforded by the boom structure of FIG. 2 is just as was depicted in FIG. 1. It is understood that ejectors 105 may be arranged linearly, as shown in FIG. 2, or in a curved configuration.

Figure 3:
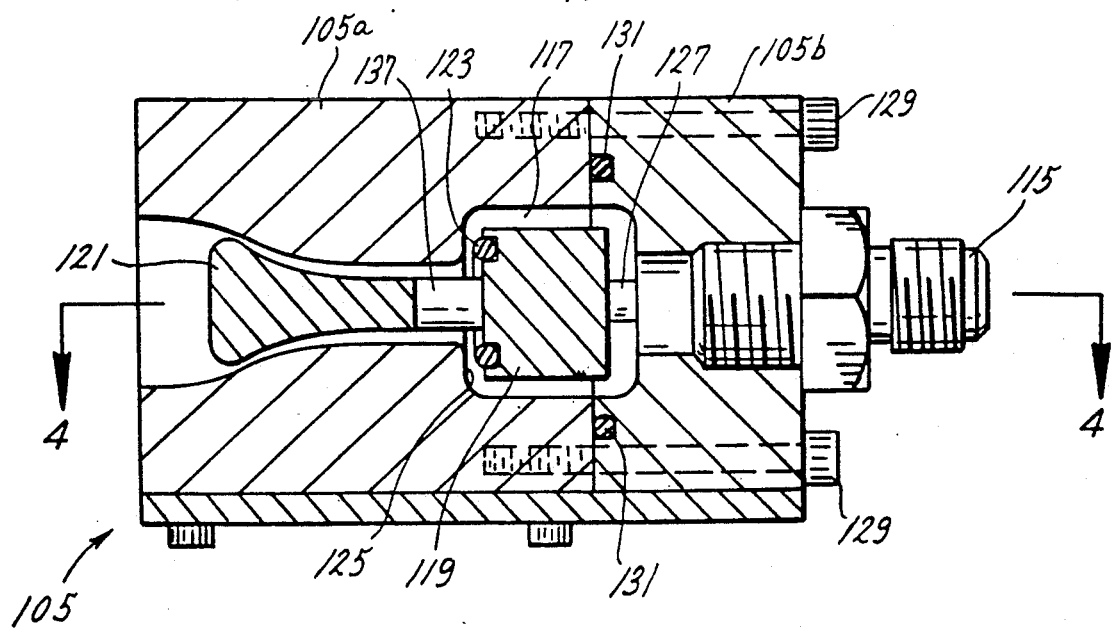
FIG. 3. is a side view illustration of a single cooling fluid ejector shown in the liquid droplet radiator system modules of FIGS. 1 and 2.

Referring to FIG. 3, a side view of an individual liquid ejector 105, as was previously shown in FIGS. 1 and 2 is shown. Liquid ejector 105 has a housing front section 105a and a housing rear section 105b. A fluid inlet 115 is located in the rearward portion of liquid ejector 105. An annular chamber 117 is in fluid contact with fluid inlet 115. A slidably adjustable block 119 defines the inner surface of annular chamber 117. A tongue 121 is fixably attached to block 119. An oval "o" ring 123 fits against the front face of block 119 in a position to enable sealing engagement with a surface 125 within liquid ejector 105.

One of two adjustment screw shafts 127 is visible in the sectional view of FIG. 3. Shaft 127 is fixedly attached to block 119, and with respect to FIG. 3 is horizontally movable therewith. A multiplicity of housing bolts 129 secure housing front section 105a and a housing rear section 105b. A housing "o" ring fits between housing front section 105a and a housing rear section 105b to help seal annular chamber 117.

Figure 4:
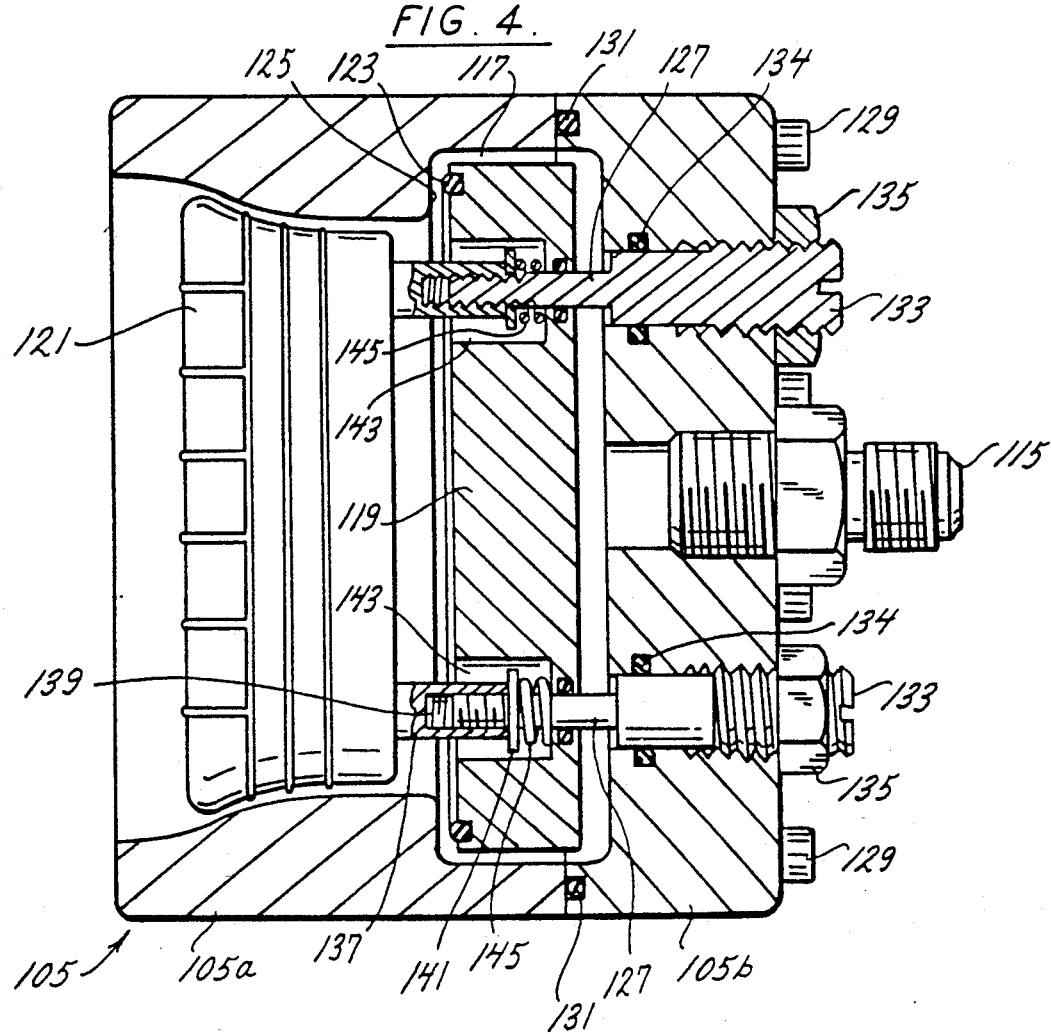
FIG. 4. is a top view illustration of a single cooling fluid ejector shown in the liquid droplet radiator system modules of FIGS. 1 and 2.

Referring to FIG. 4, a top view of liquid ejector 105 is illustrated. A pair of adjustment screws 133 each screwably engage housing rear section 105b, and each rotatably engages a shaft 127 attached to block 119. Surrounding adjustment screws 133 are "O" rings 134 which aid in flaid sealing. A locking nut 135 surrounds each adjustment screw 133 exteranlly of housing rear section 105b to enable the position of block 119 and tongue 121 to become slidably fixed within fluid ejector 105. Adjustment screws 133 are sealed by "O" rings 134 to prevent fluid leakage thru housing rear section 105b.

The details of attachment of tongue 121 to block 119 are shown in FIG. 4. Tongue 121 is fitted with a pair of tubular extensions 137 having internally threaded surfaces, and a spring stop flange 141. Each tubular extension 137 extends into a cavity 143 within block 119. A spring 145 fits against the rear surface of cavity 143, and against the spring stop flange 141. Spring 145 acts to keep tongue 121 extended in normal service.

Since fluid flow will be from right to left, with respect to FIG. 4, tongue 121 will be normally urged leftward without assistance from spring 145. However, if tongue 121 becomes jammed within housing front section 105a, or if a piece of debris becomes trapped between tongue 121 and housing front section 105a, the adjustment screws 133 can still be used to seal off flow since block 119 can be urged forward to move with respect to tongue 121 by compression of springs 145. In this manner, "o" ring 123 can be brought into contact with surface 125 to enclose annular cavity 117.

FIG. 5 illustrates a sectional view of circularly shaped collector 109 and boom 113, as was illustrated in FIG. 2. At the left of FIG. 5, boom 113 internally supports a motor 151. Motor 151 has a hollow shaft 153 extending to a point near the end of boom 113. Shaft 153 is connected to a plate 155. Plate 155 is connected to an annular tube 157. Annular tube 157 is supported against the exterior of the end of boom 113 by set of bearings 159. A collection trough 161 is connected to and positioned concentrically outward of annular tube 157. Trough 161, annular tube 157, plate 155 and shaft 153 all rotate together driven by motor 151.

A stationary pitot tube 163 is positioned against the inner wall of circularly shaped collector 109. Pickup tube 163 extends through the annular space between rotatable, or spinning trough 161 and the inner wall of circularly shaped collector 109. Near the outer lip of circularly shaped collector 109, pitot tube 163 curves toward the axis of boom 113, extends past the spinning lip 165 of trough 161. Once sufficiently cleared beyond the spinning lip 165 of trough 161, the path of the pitot tube 163 changes direction 180 degrees and extends concentrically away from the axis of said boom 113, and then makes a 90 degree turn in the direction opposite the direction in which trough 161 is turning. Pickup tube then extends a short distance along a radial channel 167 near the spinning lip 165 of trough 161, before terminating in an opening 169. In this manner, the opening 169, which forms the open end of pitot tube 163 always opposes the radial path of travel of radial channel 167.

Once the liquid enters pitot tube 163, assisted by the kinetic energy gained by virtue of its radial velocity, the liquid goes through a vane pump 170, and returns through boom 113 via passage through plate 155 and hollow shaft 153. The details surrounding radial channel 167 should be designed be as efficient as possible in collecting the liquid and returning it back through the boom 113 or other means to bring it to the point of heat transfer.

One method in which fluid flow within pitot tube 163 may be aided is illustrated in FIG. 6. If a high pressure source of fluid can be made available, it can be used to increase fluid collection efficiency. Referring to FIG. 6, a view normal to the direction of spin of trough 161 is illustrated. The cross section of radial channel 167 is illustrated in motion to the viewers left, passing close to opening 169 of pitot tube 163. Adjacent pitot tube 163 is a flow assist tube 173. Flow assist tube 173 makes a U-shaped turn near the end of pitot tube 163, traverses the boundary of and extends for a short length coaxially within pitot tube 163.

Flow assist tube 173 has an opening 175 which opens in the direction of flow of fluid within pitot tube 163. High pressure flow from flow assist tube 175 will, to an extent, help overcome the friction encountered by fluid entering pitot tube 163.

The details surrounding radial channel 167 should also be designed to allow kinetic pitot of the radially spinning centrifugially trapped liquid with as little loss as possible. It must be kept in mind that with respect to the spinning liquid, the opening 169 and the end of pitot tube 163 will be rapidly radially tearing through the liquid in radial channel 167 causing a violent ripple much like the boot on a motor boat engine as it cuts through the water. Consequently, FIGS. 7, 8, and 9 illustrate three designs which should aid in prevention of fluid loss due to the ripple and vortex created by the end of pitot tube 163.

Referring to FIG. 7, a stationary V-shaped shield 181 forms a liquid barrier. The rim of trough 161 has been modified to include a first inwardly curved wing 183 and a second wing 185 opposing the first wing 183. The wings 183 and 185 are spaced close to, but do not touch shield 181, as wings 183 and 185 spin with trough 161. In addition, wing 183 is equipped with a winglet 187 and wing 185 is equipped with a winglet 189. Winglets 187 and 189 extend toward channel 167 to form a barrier approximately normal to the space between wings 183, 185 and shield 181. Note that stationary pitot tube 163 extends through stationary shield 181, and that wings 183 and 185 form planes loosely perpendicular to each other.

Referring to FIG. 8, a stationary flat shaped shield 191 forms a liquid barrier. Nearer the rim of trough 161 is a first flat wing 193 and a second flat wing 195 opposing and parallel to the first wing 193. The wings 193 and 195 are spaced closely above, but do not touch shield 191, as wings 193 and 195 spin with trough 161. Note that wings 193 and 195 form planes which are approximately parallel to each other. Note that stationary pitot tube 163 extends through stationary shield 191.

Referring to FIG. 9, a stationary shield 201 forms a liquid barrier. Shield 201 is has a flat central section, and side portions which are angled upwardly away from liquid channel 167. Nearer the rim of trough 161 is a first wing 203, one side of wing 203 having and terminating in a flat central section connected to trough 161, the other side terminating in a downwardly angled portion. The downwardly angled portion of wing 203 is parallel to and fits over the upwardly angled portion of shield 201.

Farther from the rim of trough 161 is a second wing 205, one side of wing 205 having and terminating in a flat central section connected to trough 161, the other side terminating in a downwardly angled portion. The downwardly angled portion of wing 205 is parallel to and fits over the other upwardly angled portion of shield 201. Liquid from channel 167 must pass around shield 201, and through the parallel space created between the angled portions of shield 201 and wings 203 and 205 to escape. The downwardly angled portions of wings 203 and 205 are spaced closely above, but do not touch the upwardly angled portions of shield 201, as wings 203 and 205 spin with trough 161. Note that wings 193 and 195 form planes which are approximately parallel to each other. Note that stationary pitot tube 163 extends through stationary shield 201. Note that the shields and wings 185, 195 and 205 are "castellated" to allow a fluid path along the rotating surface of radial channel 167.

Referring to FIG. 2, in the operation of the collector, liquid droplets are ejected from a series of droplet ejectors 105. Referring to FIG. 5, droplets striking the trough 16lare forced to the outer rim forming fluid channel 167. Liquid in fluid channel 167 is forced through the pitot tube 163 and sent to a vane pump 170. Cooled liquid is pumped down the boom 113 back to a heat exhange unit (not shown) which will retransmit heat to the fluid to be radiated into space on the next heat ejection cycle.

The orientation of the trough 161 of FIGS. 7-9 provides high collection efficiency by preventing droplet formation and loss. It prevents loss of droplets in the wake region down stream of the pitot tube. No seals are required, which eliminates leakage and mechanical wear problems. The trough 161 rim is configured to enhance collection pressure by increasing the centrifugal equivalent of gravitation head. This also minimizes fluid remaining in the collector. The downstream pump (not shown) can be equipped with an accumulator to provide continuous flow in the event of momentary interruptions in flow and to start up the flow. This feature is especially important wit the liquid droplet radiator concepts.

The flow assist tube 173 connected to pitot tube 163 enhances the pump inlet pressures, increases outflow rate, and prevents cavitation in the vane pump 209 downstream of the pitot tube. The flow assist tube/ejector also allows the trough 161 to be operated at lower rpm, which minimizes splashing of the liquid collected. Shields 181, 191, and 201 prevent liquid loss from liquid climbing up the pitot tube 161.

Other possible uses for the apparatus described herein include a zero-gravity urine collector possibly using water to enhance outflow; pumping of particularly corrosive fluids for which mechanical seals would pose wear, life, and leakage problems; and the pumping of liquids without any gas entrainment. Phase separation processes can use the combined advantages of centrifugal collection and pitot tube enhanced flow with a secondary ejector.

The transfer of turbulent kinetic energy into surface free energy is the underlying principle associated with this generator concept. Turbulence generating means 121a is shown on tongue 121 in FIG. 4, and includes any combination of vanes, rakes, surface roughness, etc. that creates substantial turbulence prior to liquid ejection. The estimate of the minimum amount of turbulent kinetic energy needed requires consideration of the additional surface area of the multitudes of droplets. The surface free energy of a droplet is the area times the surface tension, or $$4\pi r^2 \sigma \qquad (1)$$

The turbulent kinetic energy of the quantity of fluid equal in mass to a droplet of radius r is $$\tfrac{2}{3}\pi \rho r^3 u'^2 \qquad (2)$$

where $u'^2$ is the average square of the velocity associated with turbulence before the stream exits the generator.

$$We = \frac{\rho u'^2 D_0}{\sigma} = 12 \qquad (3)$$

where We, a modification of the Weber number, is seen to be of the order of 12 or greater to induce breakup.

This result is consistent with the results of an analysis of the opposite effect—droplet coalescence. The effects of inter- and intrastream collisions on the possibility of droplet breakup, scattering, and loss of fluid at the collector have been examined. Two independent analyses have shown that droplet coalescence predominates. Fluid loss from collisions will therefore not be a problem.

The first analysis was based on conservation of kinetic and surface free energy before and after collision and the assumption that viscous dissipation occurred during the droplet merging times. The second analysis was based upon the solution of the three-dimensional fluid dynamic equations including surface tension, for droplets of equal and unequal size, impinging "head on" and at various grazing incidence angles.

Equation (3) is based on all of the turbulent kinetic energy being transformed into droplet surface free energy. Some additional turbulent kinetic energy would be required to offset viscous effects. Thus, the assumption of a Weber number, based on a turbulent velocity greater than 12 is a reasonable approximation. Choosing We=24, the turbulent velocity is estimated for liquid tin to be:

$$u'^2 = \frac{24}{\rho D_0} = \frac{24(.5)}{6800 \cdot 150 \times 10^{-6}} \qquad (4)$$

giving u' 3.4 m/sec.

Since the average free stream velocity exiting the nozzle is of the order of 10 m/sec, the relative energy that is required to be transformed into turbulent kinetic energy is approximately:

$$\left(\frac{3.4}{10}\right)^2 = 11\% \qquad (5)$$

Thus, an 11% increase in energy is required to impart the proper turbulence characteristics to the liquid droplets.

The forgoing disclosure and description of the invention are illustrative and explanatory thereof, and various changes in the materials of construction, physical configuration, types of control, (e.g., electrical, mechanical, pneumatic, etc.) as well as in the details of the illustrated embodiments may be made without departing from the spirit and scope of the invention.

What is claimed is:

1. A fluid ejection apparatus comprising:
    housing means for accepting the flow of a fluid, said housing means having an orifice;
    flow distribution means, fittable within said orifice of said housing means, for facilitating wide distribution of said fluid flowing through the cross section of said orifice between said flow distribution means and said housing means, said flow distribution means being positionally adjustable within said housing means to thereby control the flow rate of said fluid even to the extent of total shut-off, said flow distribution means further comprising a tongue member and a flow control block attached thereto;
    said housing means further comprising a generally rectangular block shaped housing, an inlet fluid port and at least one adjustment screw mounted on an outer surface of said housing;
    wherein said flow control block and said tongue member are axially movable within said housing both in unison and relative to one another, in response to the movement of said at least one adjustment screw.

2. The fluid ejection apparatus, as recited in claim 1, said at least one adjustment screw being threadedly engaged with said housing and extending through said housing and said flow control block, and further comprising an attachment means attaching said tongue member to said flow control block;
    whereby when said adjustment screw is rotated, at least one of said flow control block and said tongue member slide axially within said housing, thereby controlling the flow of fluid through said housing.

3. The fluid ejection apparatus as recited in claim 2, wherein said at least one adjustment screw extends into a corresponding cavity within said flow control block, and said attachment means comprising:
    at least one tubular extension extending from said tongue member and into each said cavity within said flow control block, the number of tubular extensions being the same as the number of adjustment screws and the number of cavities, such that there is one adjustment screw and one tubular extension extending into each cavity, said tubular extension having an internally threaded surface and a spring stop flange;
    each said adjustment screw being threaded into each said tubular extension, said cavity having a rear surface through which said adjustment screw enters said cavity, a spring being mounted between said spring stop flange and said cavity rear surface, said spring biasing said tongue member in the direction of fluid flow through said housing means;
    whereby when said adjustment screw is rotated, said flow control block and said tongue member are adapted to move axially within said housing, both in unison, and relative to one another if one of said members is prevented from moving, said relative motion compressing said spring.

4. A fluid ejection apparatus comprising:
    housing means for accepting the flow of a fluid, said housing means having an orifice; and,
    flow distribution means, fittable within said orifice of said housing means, for facilitating wide distribution of said fluid flowing through the cross section of said orifice between said flow distribution means and said housing means, said flow distribution means being positionally adjustable within said housing means to thereby control the flow rate of said fluid even to the extent of total shut-off, said flow distribution means comprising:
    a tongue member; and,
    a flow control block, attached to said tongue member, said flow control block and said tongue member being axially movable within said housing, both in unison and relative to one another.

5. The fluid ejection apparatus, as recited in claim 4, wherein said housing means further comprises:
a generally rectangular block shaped housing;
an inlet fluid port mounted on an outer surface of said housing; and,
at least one adjustment screw, mounted on an outer surface of said housing, to control the relative position of said flow distribution means within said housing.

6. The fluid ejection apparatus as recited in claim 5, said at least one adjustment screw being threadedly engaged with said housing and extending through said housing and said flow control block, and further comprising an attachment means attaching said tongue member to said flow control block;
whereby when said adjustment screw is rotated, at least one of said flow control block and said tongue member slide axially within said housing, thereby controlling the flow of fluid through said housing.

7. The fluid ejection apparatus as recited in claim 6, wherein said at least one adjustment screw extends into a corresponding cavity within said flow control block, and said attachment means comprising:
at least one tubular extension extending from said tongue member and into each said cavity within said flow control block, the number of tubular extensions being the same as the number of adjustment screws and the number of cavities, such that there is one adjustment screw and one tubular extension extending into each cavity, said tubular extension having an internally threaded surface and a spring stop flange;
each said adjustment screw being threaded into each said tubular extension, said cavity having a rear surface through which said adjustment screw enters said cavity, a spring being mounted between said spring stop flange and said cavity rear surface, said spring biasing said tongue member in the direction of fluid flow through said housing means;
whereby when said adjustment screw is rotated, said flow control block and said tongue member are adapted to move axially within said housing, both in unison, and relative to one another if one of said members is prevented from moving, said relative motion compressing said spring.

8. The fluid ejection apparatus as recited in claim 4, and further comprising turbulence generating means, integral with the outer surface of said flow distribution means, for facilitating the dispersion of fluid ejected from said fluid ejection means.

9. A fluid ejection apparatus comprising:
housing means for accepting the flow of a fluid, said housing means having an orifice;
flow distribution means, fittable within said orifice of said housing means, for facilitating wide distribution of said fluid flowing through the cross section of said orifice between said flow distribution means and said housing means, said flow distribution means being positionally adjustable within said housing means to thereby control the flow rate of said fluid even to the extent of total shut-off, said flow distribution means further comprising a tongue member and a flow control block attached thereto;
said housing means further comprising a generally rectangular block shaped housing, an inlet fluid port and at least one adjustment screw mounted on an outer surface of said housing, said at least one adjustment screw extending through said housing and said flow control block, and into a corresponding cavity within said flow control block, an attachment means attaching said tongue member to said flow control block, said attachment means comprising:
at least one tubular extension extending from said tongue member and into each said cavity within said flow control block, the number of tubular extensions being the same as the number of adjustment screws and the number of cavities, such that there is one adjustment screw and one tubular extension extending into each cavity, said tubular extension having an internally threaded surface and a spring stop flange;
each said adjustment screw being threaded into each said tubular extension, said cavity having a rear surface through which said adjustment screw enters said cavity, a spring being mounted between said spring stop flange and said cavity rear surface, said spring biasing said tongue member in the direction of fluid flow through said housing means;
wherein said flow control block and said tongue member are axially movable within said housing, in response to the movement of said at least one adjustment screw, thereby controlling the flow of fluid through said housing.

10. The fluid ejection apparatus as recited in claim 9, and further comprising turbulence generating means, integral with the outer surface of said flow distribution means, for facilitating the dispersion of fluid ejected from said fluid ejection means.

* * * * *